United States Patent [19]

Bice et al.

[11] 4,136,251

[45] Jan. 23, 1979

[54] EXTRUSION PROCESS FOR RECOVERY OF POLYMERS FROM THEIR DISPERSIONS IN LIQUIDS

[75] Inventors: Archie R. Bice, Hockessin, Del.; Donald K. Burchett, Louisville, Ky.

[73] Assignee: E. I. Du Pont de Nemours and Company, Wilmington, Del.

[21] Appl. No.: 832,354

[22] Filed: Sep. 12, 1977

[51] Int. Cl.² ............................ C08F 6/22; C08F 6/24
[52] U.S. Cl. .................................... 528/486; 159/2 E; 366/85; 260/816 R; 260/821; 264/86; 264/349; 528/494; 528/502
[58] Field of Search ................... 528/502, 486, 494; 260/821, 816

[56] References Cited

U.S. PATENT DOCUMENTS

| 3,035,306 | 5/1962 | Rossiter | 18/12 |
| 3,160,620 | 12/1964 | Petersen | 528/486 |
| 3,742,093 | 6/1973 | Skidmore | 528/502 |
| 3,917,507 | 11/1975 | Skidmore | 159/2 E |
| 3,981,854 | 9/1976 | Kelly | 528/481 |
| 3,993,292 | 11/1976 | Skidmore | 259/193 |

FOREIGN PATENT DOCUMENTS 1121714 7/1960 United Kingdom.

*Primary Examiner*—Stanford M. Levin

[57] ABSTRACT

Polymers are isolated from their dispersions in liquid media in a twin-screw extruder, wherein the screws in the feed area are intermeshing and fully wiping each other and the extruder bore, the polymer dispersion or latex (which is coagulated in the first zone) being conveyed to a high pressure seal zone, liquid being forced upstream and out of the extruder, and the polymer being conveyed through the seal, into a reduced pressure zone, where most remaining liquid is removed, and finally into a pumping zone from which it is extruded. The invention avoids high pressure pumping of polymer dispersions and also is applicable to dispersions of sticky thermoplastic or elastomeric materials, which have caused considerable difficulties in the past.

10 Claims, 2 Drawing Figures

EXTRUSION PROCESS FOR RECOVERY OF POLYMERS FROM THEIR DISPERSIONS IN LIQUIDS

BACKGROUND OF THE INVENTION

This invention relates to a process for recovering a polymer from a dispersion in a liquid medium using a twin-screw extruder of special design from which solid polymer is extruded substantially free from the liquid. This process is useful for dispersions of both rubbery and thermoplastic polymers in either aqueous or nonaqueous liquids.

It is known to recover polymers from their slurries or latices by extrusion. Many types of commercial extruders have been employed for this purpose, including, for example, simple screw extruders, twin screw extruders, or the so-called French press. Because some of this equipment operates under a rather high pressure, it is also necessary to feed the liquid dispersions of polymers under high pressure. However, under those conditions, especially when polymer is subjected to high shear, for example, in screw pumps, rubber latices tend to coagulate and clog the extruder inlet. Thermoplastic polymers melt to viscoelastic masses that are difficult to convey. In some other equipment, sticky thermoplastic or elastomeric material cannot be successfully pressed or conveyed.

Chloroprene polymers and copolymers are usually isolated from their aqueous latices by the freeze-drum technique, which unfortunately has a high demand of energy. Extrusion has a greater potential and general applicability because of its lower energy requirement and lesser environmental impact. When properly designed and operated, it can also provide an overall cost advantage. Some prior art extrusion processes suffered, however, from shortcomings. For example, frequently chloroprene polymer latices were not completely coagulated when non-acidic coagulants were used; while, when acidic coagulants were used, the final polymers had insufficient alkaline reserve to provide adequate storage stability.

It thus is desirable to provide an improved extrusion process for isolating polymers from their dispersions in liquids, wherefrom the above disadvantages of prior art processes would be eliminated.

SUMMARY OF THE INVENTION

According to the present invention, there is now provided an improved process for recovering a polymer from a dispersion in a liquid medium by introducing the dispersion, and, if the dispersion is a latex which requires a chemical means of coagulation, separately introducing a latex coagulating agent, into a first zone of screw flights of a twin screw extruder having counter-rotating screws and comprising five zones; the flights of both screws in the first zone intermeshing and fully wiping each other as well as the extruder bore; the screw flights in zones 2, 4, and 5 being disposed tangentially to each other, a pressure seal between the second zone and the fourth zone constituting the third zone, and a liquid evacuation port being provided in the second zone; if the dispersion is a latex, the latex being coagulated in said first zone of the extruder; the polymer together with the liquid being conveyed by the positive displacement of the screws from said first zone into said second zone, the pressure in said second zone being sufficiently high to allow the polymer to pass through the pressure seal, while the liquid flows back and out through the evacuation port; the polymer in said fourth zone of the extruder being subjected to subatmospheric pressure in order to remove a major portion of liquid still held by the polymer; and the substantially dry polymer being conveyed out of the extruder by the pumping action of the screws.

DETAILED DESCRIPTION OF THE INVENTION

While the process of the present invention is of greatest interest in the recovery of elastomers from their latices, and in particular in the recovery of chloroprene polymers and other shear-sensitive and pressure-sensitive elastomers, it is equally suitable for the recovery of all manner of particulate polymers from their dispersions. Typical polymers that can be isolated by the process of the present invention include, for example, in addition to chloroprene polymers, the following: ethylene/vinyl acetate copolymers, polytetrafluoroethylene, poly(methyl methacrylate), poly(vinylbutyral), fluoroelastomers, ethylene-propylene copolymers, ethylene-propylene-diene (EPDM) copolymers, natural rubber, polystyrene, and polyvinyl chloride. For the purpose of this invention, a chloroprene polymer is a homopolymer of chloroprene or a copolymer of chloroprene with sulfur and/or with a comonomer having at least one ethylenic unsaturation, the proporation of chloroprene in the copolymer being at least 50 weight percent.

When chloroprene polymer latices are used in the process of this invention, they are obtained by polymerizing the required monomer or monomers in an aqueous emulsion to a desired conversion. Normally, such polymerization is carried out in an alkaline medium in the presence of free radical catalysts, especially a redox system. Polymerization of chloroprene and copolymerization of chloroprene with other monomers is well known, as described, for example, in *Encyclopedia of Polymer Science and Technology*, (Interscience, New York, 1965), Vol. 3, pp. 705 ff, under "2-Chlorobutadiene Polymers" and references cited therein. However, when the polymer is to be separated from the liquid in an extruder, the polymerization emulsion is prepared without a naphthalenesulfonate surfactant, which normally is used in such recipes. The chloroprene polymer normally contains a small amount of alkali incorporated therein. This is known as the alkaline reserve and is desirable because it increases the storage stability of the polymer. When acidic agents are used to coagulate the latex, the amount of alkali retained by the polymer may be insufficient to provide good storage stability. It, therefore, is often advisable to add to the polymer some time prior to its isolation an alkali metal hydroxide or an alkali metal salt of a weak acid. In the process of the present invention, this alkaline reserve adjustment is carried out in the same twin screw extruder.

Figure 1:
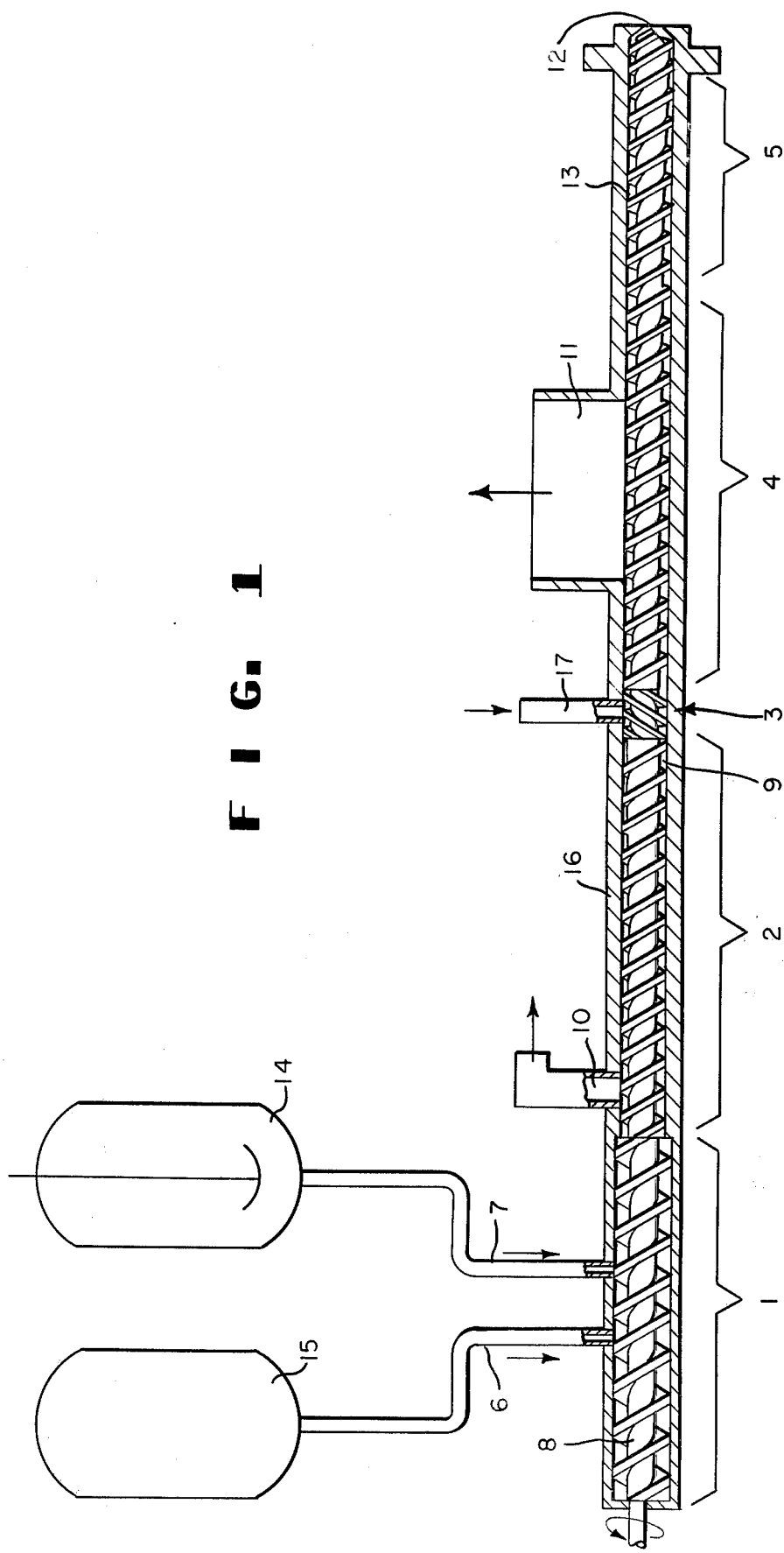
FIG. 1 is a partly diagrammatic, sectional side view of the apparatus used in the process of the present invention.

The following discussion is specifically concerned with the recovery of chloroprene polymers from their latices. The same apparatus can be used for other dispersions of polymers in liquid media, and a similar technique will be employed. In the case of slurries, rather than latices, there will be no need for a coagulant, but thickeners or other additives can be introduced into the extruder in the same manner. Referring to FIG. 1, 14 is a stirred storage tank containing chloroprene polymer latex; 15 is a storage tank containing a suitable coagulant; 16 is a twin-screw extruder housing containing screws 8, one of which is shown in FIG. 1. The extruder is divided into the following five zones; 1, the polymer coagulation zone; 2, the liquid separation zone; 3, the pressure seal; 4, the subatmospheric pressure zone; and 5, the polymer removal zone. As can be seen in FIG. 1, toward the downstream end of zone 2 the screw channels 9 can be made more shallow to provide a pumping action toward the pressure seal 3. The pressure rises high enough to force the low viscosity fluid to move counter to the screw movement. Waste liquid is removed through port 10. However, to prevent loss of polymer with the waste liquid, a mechanical dewatering device can be installed at that point. This can be, for example, a twin-screw mechanism, which returns polymer to the extruder. an automatic valve may be provided in the waste liquid exit line to maintain the desired pressure at the upstream end of zone 2. The pressure seal 3 may be one of several devices known to those skilld in extruder technology for providing a high back pressure. Shown in the figures are reverse pitch screw flight sections which are often used for this purpose.

Residual liquid is removed from the polymer in zone 4 by means of a high vacuum pump communicating with vacuum port 11. This port can be quite large, to provide for efficient evacuation; the opening can be as wide as, for example, 50–75% of the length of zone 4.

Figure 2:
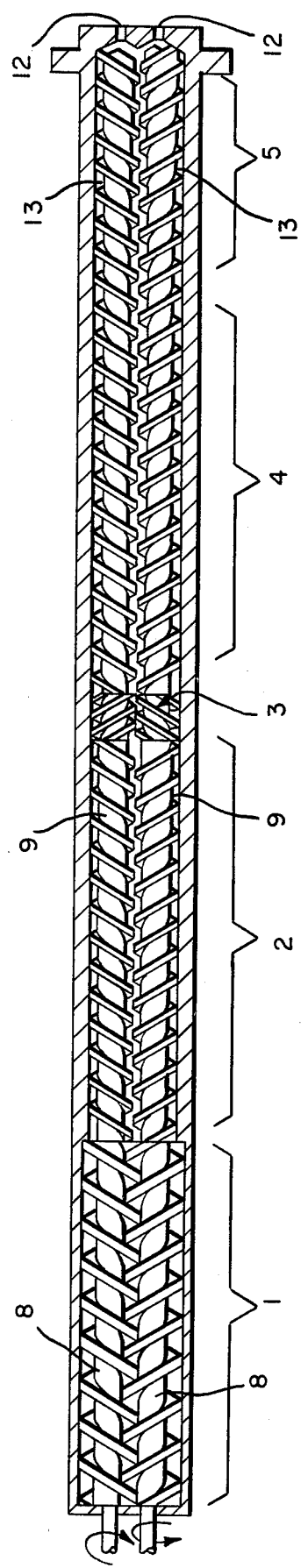
FIG. 2 is a simplified, sectional top view of the extruder screws, showing the arrangement of their flights.

Both screws 8 are seen in FIG. 2. It can be seen that in zone 1 the screw flights intermesh, while in zones 2, 4, and 5 they do not intermesh but are tangential. It will be appreciated by those skilled in the art that it is not necessary that both screws extend through the entire length of the extruder. It is quite feasible to operate the process of this invention in an extruder in which one of the screws extends only through zone 4 while the other one extends through all five zones. The polymer is extruded from zone 5 through one or more dies 12. The screw channels 13 in zone 5 also are made shallower toward the end of the extruder, so that a good pumping action may be obtained. The drawings are simplified in that they do not show various details obvious to those skilled in the art. For example, the housing is shown without any heat transfer means. Obviously, heating or cooling by means of various fluids circulating through a jacket is possible, as well as use of electric heaters or of heating or cooling coils.

In the operation of one embodiment of the process of this invention, chloroprene polymer latex and coagulant are transferred from their respective storage tanks 14 and 15 and introduced at atmospheric or slightly above atmospheric pressure onto the nip between the intermeshing screws. Preferably, the coagulant is injected slightly upstream of the latex injection point and the resulting mixture of coagulum and water is conveyed forward toward the pressure seal, which may be, for example, a section of reverse pitch segments of screws as shown or a section in which clearances between the screws and the housing are reduced to provide a restriction and, therefore, high pressure at the seal.

Water or other liquid separated from the polymer during the coagulation process is thus forced back from the pressure seal section and removed through port 10 in zone 2. With the preferred arrangement of the latex and coagulant injection ports, the amounts of dispersed polymer exiting through the water port is minimized. Residual water held by the chloroprene polymer which passes through the pressure seal is now substantially removed in zone 4, which is maintained at a pressure below about 200 mm Hg and a temperature of about 110° C. The polymer leaving this low pressure zone contains about 1% or less moisture.

Zone 1 is represented in the drawings as being a linear extension of zones 2–5. While this will be the usual configuration of a twin-screw extruder useful in the process of the present invention, other configurations also are possible. Thus, zone 1 may be at an angle to zones 2–5, the intermeshing screws of zone 1 being driven by a mechanism separate from that which drives the screws in zones 2–5.

Suitable acidic coagulants include mineral acids and carboxylic acids, which may be used alone or in admixture with salts such as sodium chloride, sodium sulfate, or sodium acetate. Preferred is an aqueous solution of acetic acid. The concentration of such a solution can be as low as 2% or as high as 50%. Preferred salt is sodium acetate, which can be added as a concentrated, about 50%, solution. The upper limit of coagulant concentration depends to a large extend on the flow rate of its solutions.

Water-dispersible thickeners also can be used in this process. They can be added with the latex, with the coagulant, or as a separate stream. The thickener increases the efficiency of coagulation and minimizes the amount of dispersed polymer in the effluent water. The preferred thickener is hydroxyethylcellulose. When about 0.1% of hydroxyethylcellulose is used, the effluent water typically contains no more than about 0.03% by weight of solids, and the yield of polymer is about 99.9%. Other suitable thickeners include, for example, various starches, gums, and peptides known to those skilled in the art.

To control scorch and provide good storage stability of the dry polymer, it is advisable that the alkaline reserve of the polymer product be at the desired level, for example 0.6–2.2 meg. HCl/100 g of polymer. Alkaline reserve is determined by titrating a solution of polymer in tetrahydrofuran with aqueous hydrochloric acid in the presence of methylene blue indicator to neutral red end point (pH 6.2–6.4). Alkaline reserve is adjusted by adding to the polymer a basic material such as, for example, alkali metal hydroxides or alkali metal salts of $C_1$–$C_6$ carboxylic acids having a $pK_a$ in water at 25° C. of about 3.5–5.0; for example, sodium and potassium salts of acetic, propionic, formic, benzoic, and lactic acids. Sodium acetate is preferred. Instead of adding such an agent at an early stage of polymer isolation, where it would be lost with effluent water, it is preferred to add it as far as possible downstream from the water removal port 10. The location of the basic agent addition port can be at the downstream end of zone 2, in zone 3, or at the upstream end of zone 4. The most practical is addition in the pressure seal area. The basic agent is normally pumped as an aqueous solution. It has to be kept in mind that the pumping pressure must be at least equal to the internal pressure in the extruder at that location. Thus, the pumping pressure will be the highest in zone 3, while in zone 4 the solution can be added at atmospheric pressure. The alkaline agent is conveniently added through port 17 shown in FIG. 1.

This invention is now illustrated by the following examples of certain preferred embodiments thereof, where all parts, proportions, and percentages are by weight unless otherwise indicated.

EXAMPLE 1

Polychloroprene dispersion is made by dissolving 2.85 parts by weight of disproportionated rosin and 0.23 part of dodecyl mercaptan in 100 parts of chloroprene, dispersing this in 86.82 parts of water containing 0.53 part of sodium hydroxide and 0.30 part of sodium sulfite and then polymerizing at 40° C., with the addition of potassium persulfate and the sodium salt of $\beta$-anthraquinonesulfonic acid is required to maintain a convenient rate of polymerization until about 67% of the chloroprene has been polymerized. The polymerization is then stopped by adding p-t-butylcatechol and thiodiphenylamine. The unpolymerized chloroprene is removed by steam distillation at reduced pressure. To the latex is added a 1% solution of hydroxyethyl cellulose in the ratio of 1 part solution to 9 parts of latex.

Approximately 5650 cc/min of the above latex is fed to a nominal 2-inch (5.08 cm) diameter counter-rotating twin screw extruder that has an overall barrel length-to-diameter ratio of approximately 53. The extruder is driven from the end opposite the product discharge end with screw speeds of 200 rpm. The initial 13 screw diameters from the drive end of the machine contain intermeshing screw elements approximately 2⅜ inches (6.03 cm) outside diameter. The remaining screw elements to the product discharge end comprise nominal 2-inch (5.08 cm) diameter tangential screws.

The latex is introduced onto the nip between the intermeshing screws approximately 8½ diameters from the drive end. A coagulant solution containing approximately 3.0% acetic acid and 4.0% sodium acetate is fed to the extruder one inch (2.54 cm) upstream (toward the drive end) from the latex feed point at a rate of 1126 cc/min. The latex is coagulated by the action of the screws and the coagulant and the resulting mixture of coagulum and water is conveyed forward into a pressure seal zone where most of the water is squeezed from the coagulum.

This pressure seal, extending from 27 to 28.5 diameters from the drive end of the machine, is formed by reducing the open area for flow between the screws and the barrel through adjustment of a radially movable barrel segment. The movable barrel segment is adjusted to maintain a pressure on the coagulum of approximately 850 psi (5856 KPa). The water expressed from the coagulum overflows through a mechanical filter upstream from the high pressure zone located 15 diameters from the drive end of the machine.

The dewatered coagulum passes into a heated vacuum vent section approximately 6 diameters long where most of the remaining mixture is flashed from it. The vent section is maintained at 135° C. by adjusting the flow of steam through channels in the barrel. The pressure in the vent is maintained at 160 mm of mercury. The coagulum is conveyed through the vent section to a final pump-out zone where sufficient pressure is generated to extrude the dried coagulum through a multihole die. The product exits the die at 135° C. and contains 0.6% water. The residual alkalinity of the product is 1.70 meg/100 grams of polychloroprene.

EXAMPLE 2

A latex is coagulated and dried in the same manner as in Example 1 with the exception that sodium acetate is left out of the coagulant solution. Instead, a saturated solution of sodium acetate is added at the downstream end of the high pressure zone at a rate sufficient to give dried product having a residual alkalinity of 1.70 meg/100 grams of polychloroprene.

We claim:

1. A process for recovering a polymer from a dispersion in a liquid medium comprising introducing the dispersion, and, if the dispersion is a latex which requires a chemical means of coagulation, separately introducing a latex coagulating agent, into a first zone of screw flights of a twin screw extruder having counter-rotating screws and comprising five zones; the flights of both screws in the first zone intermeshing and fully wiping each other as well as the extruder bore; the screw flights in zones 2, 4, and 5 being disposed tangentially to each other, a pressure seal between the second zone and the fourth zone constituting the third zone, and a liquid evacuation port being provided in the second zone; if the dispersion is a latex, the latex being coagulated in said first zone of the extruder; the polymer together with the liquid being conveyed by the positive displacement of the screws from said first zone into said second zone, the pressure in said second zone being sufficiently high to allow the polymer to pass through the pressure seal, while the liquid flows back and out through the evacuation port; the polymer in said fourth zone of the extruder being subjected to subatmospheric pressure in order to remove a major portion of liquid still held by the polymer; and the substantially dry polymer being conveyed out of the extruder by the pumping action of the screws.

2. The process of claim 1 wherein the dispersion is a slurry.

3. The process of claim 1 wherein the dispersion is a latex.

4. The process of claim 3 wherein the polymer is a chloroprene polymer.

5. The process of claim 4 wherein the coagulating agent is added through a port in the extruder housing upstream of the point of introduction of the chloroprene polymer.

6. The process of claim 5 wherein a basic agent is added through a port located in the extruder area from the downstream end of zone 2 to the upstream end of zone 4 to bring the alkaline reserve of the polymer to the desired level.

7. The process of claim 6 wherein the coagulant is at least one of aqueous acetic acid and aqueous solution of sodium acetate.

8. The process of claim 1 wherein a thickener dispersible in the liquid dispersing medium is introduced into the extruder.

9. The process of claim 8 wherein the liquid dispersing medium is water and the thickener is hydroxyethylcellulose.

10. The process of claim 1 wherein the temperature in zone 4 is at least about 110° C. and the pressure is below about 200 mm Hg.

* * * * *

UNITED STATES PATENT OFFICE
CERTIFICATE OF CORRECTION

PATENT NO. : 4,136,251
DATED : January 23, 1979
INVENTOR(S) : Archie Robert Bice AND Donald Keith Burchett It is certified that error appears in the above-identified patent and that said Letters Patent are hereby corrected as shown below:

In Column 2, line 35, "proporation" should be --proportion--.

In Column 3, line 22, "an" should be --An--.

In Column 3, line 26, "skilld" should be --skilled--.

Signed and Sealed this

Seventeenth Day of July 1979

[SEAL]

Attest:

LUTRELLE F. PARKER
Attesting Officer    Acting Commissioner of Patents and Trademarks